Nov. 26, 1968    L. I. JENSEN    3,412,607
METHOD AND APPARATUS FOR DRILL STEM TESTING
Filed June 3, 1966    2 Sheets-Sheet 2

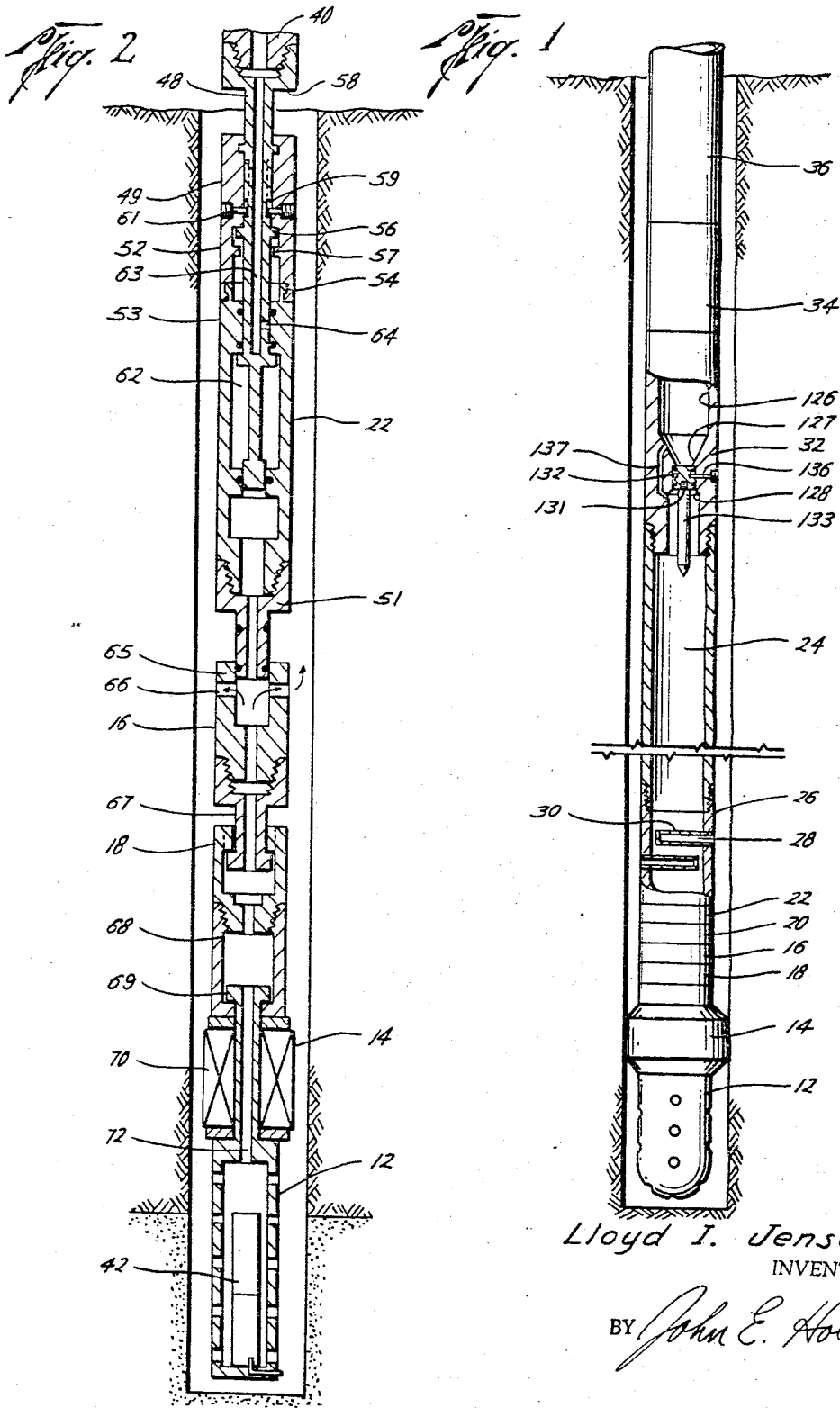

Lloyd I. Jensen
INVENTOR.

BY John E. Holder

ATTORNEY

United States Patent Office 3,412,607
Patented Nov. 26, 1968

3,412,607
METHOD AND APPARATUS FOR DRILL
STEM TESTING
Lloyd I. Jensen, Calgary, Alberta, Canada, assignor, by mesne assignments, to Schlumberger Technology Corporation, New York, N.Y., a corporation of Texas
Filed June 3, 1966, Ser. No. 555,099
10 Claims. (Cl. 73—155)

ABSTRACT OF THE DISCLOSURE

Methods and apparatus for drill stem testing including a packer, a tester and a closable chamber suspended in a well bore on a pipe string. With the packer set, the tester is opened and this occurrence can be detected at the surface, whereupon the upper end of the chamber is closed to permit a sample of formation fluids to collect in the chamber. Then the tester is closed and the tools elevated to the surface where the sample trapped in the closed chamber can be removed safely and in secrecy.

---

This invention relates to a method and apparatus for drill stem testing, and, more particularly, to a drill stem testing system utilizing a closed chamber for maximum control of fluid recovery from the drill stem test.

The control of the fluid recovery in a drill stem test is of primary importance where maximum secrecy and safety are important factors in the drill stem test procedure. It is desirable under certain conditions to permit only authorized personnel to determine the type of recovery and pressures involved. Maximum safety is desirable when the testing is being done at a town site or at night.

In a normal drill stem testing operation, a tester valve and packer are inserted into the well at the lower end of the string of pipe or tubing. The packer is disposed at a location just above the section to be tested and is expanded to close off the bore of the well. Thus, the section of test is isolated from a control fluid which is usually mud. The testing tool includes a pressure recorder which measures the pressure of the isolated formation during the testing operation. The tester valve is opened to permit formation fluids to flow into the string of tubing. This flow may appear at the surface if the pressures are great enough. The tester valve is then closed and a final pressure is recorded.

When the string of tubing is brought to the surface, the sections of tubing and tools are removed from the string, whereupon the formation fluids in the tubing are exposed at the surface or floor of the drilling platform. Such exposure of formation fluids may be undesirable under certain circumstances for reasons of safety or secrecy. For example, it is often desirable to test wells at night, when electrical power is being generated on the rig floor to provide lighting. Normally, the presence of such electrical power at the well head may present a hazard if flammable formation fluids and gases are exposed at the surface during testing operations.

Accordingly, it is an object of the present invention to provide new and improved methods and apparatus for conducting closed chamber drill stem tests.

Therefore, in accordance with the present invention, and drill stem test, the fluid recovery is limited to a given chamber which is closed off at its upper end after the test is started. After a period of itme, the test valve at the lower end of the chamber is closed and the string of tools is retrieved to the surface. Means are provided for reversing the fluids out of the closed chamber into a closed receptacle at the surface. The valve at the upper end of the chamber and the means for reversing the fluids out of the chamber are constructed so that a vertical bore may be provided through the tools for the lowering of devices through the tool string.

The novel features of the present invention are set forth with particularity in the appended claims. The present invention, both as to its organization and manner of operation together with further objects and advantages thereof, may best be understood by way of illustration and example of an embodiment when taken in conjunction with the accompanying drawings in which:

FIG. 1 is a schematic view of a string of well tools embodying the present invention;

FIG. 2 shows a formation tester and associated well tools for use in the present invention.

Figure 3A:
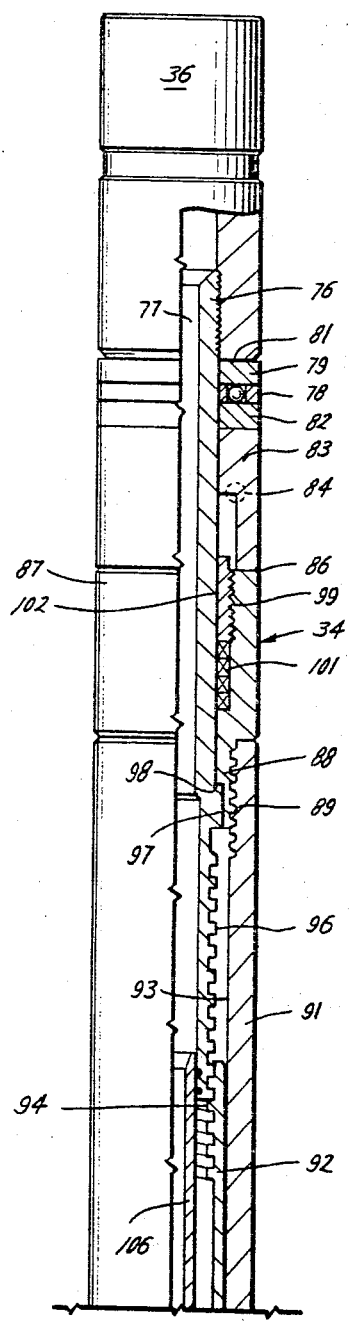
FIGS. 3A and 3B show a valve for use at the upper end of the sample chamber in the present invention.

Referring first to FIGURE 1, a string of well tools is schematically shown suspended within a well bore. A perforated anchor 12 is positioned at the lower end of the tool string for permitting the entry of formation fluids into the string. Above the anchor is a packer 14 for isolating the formation to be tested from the rest of the well bore. Normally a bypass valve 16 and safety joint 18 and other accessory well tools 20 such as jars would be included in the string above the packer. A formation tester 22 is positioned above the accessory tools and is included in the string to selectively open and close the string thereabove to the flow of formation fluids.

In accordance with the present invention, a sample chamber 24 is provided above the tester valve 22. This sample chamber is in the form of sections of drill pipe and may include one or several sections of drill pipe forming any desired volume of sample receiving chamber. At the lower end of the sample chamber is a reverse circulating sub 26. The reverse circulating sub includes ports 28 for communicating the interior of the sample chamber with the exterior of the pipe string. The ports are closed by plugs 30 which may be broken off to open the ports in the reverse circulating sub. A bar dropper sub 32 is positioned at the upper end of the closed chamber to provide a means for breaking the plugs 30 in their reverse circulating sub 26. A valve 34 for opening and closing the upper end of the chamber is shown positioned above the bar dropper sub 32. The valve 34 has its upper end connected to a string of drill pipe or tubing 36 for suspending the entire tool string in the well bore.

The formation tester valve 22 is illustrated in greater detail in the schematic view of Fig. 2. The tester 22 has an indexing system, splines, and sample chamber, etc., similar to that shown in a copending United States patent application Ser. No. 333,224, now Patent No. 3,308,882. The formation tester 22 is connected to the lower end of a pipe or tubing 40. A bypass section 16, safety joint 18, packer assembly 14 and a perforated anchor section 12 are shown connected below the tester. A pressure recording device 42 is positioned within the anchor section. The tester 22 has a mandrel 48 telescopically received within a housing 49, the mandrel 48 and housing 49, respectively, being attached between the pipe 40 and a mandrel 51 of the bypass section 16. The tester mandrel 48 and housing 49 are relatively movable between expanded, contracted and intermediate telescopic positions.

The tester housing has upper and lower sections 52 and 53 rotatively coupled to one another by a swivel connection 54. Tester mandrel 48 has outwardly extending splines or lugs 56 arranged for abutment with inwardly extending housing splines or lugs 57 in an intermediate telescopic position. The mandrel 48 has a collar 58 which abuts the upper housing section 52 in a contracted telescopic position. An indexing mechanism includes an index slot 59 on the tester mandrel and a cooperating indexing pin 61 in the tester housing. The indexing mechanism is arranged for manipulation of the mandrel splines 56 relative to the housing splines 57 to permit movement of the housing 49 and mandrel 48 between the expanded, contracted, and intermediate positions. Swivel connection 54 permits the mandrel 48 to be reciprocated longitudinally between the various positions while the upper housing 52 is rotated relative to the lower housing 53.

The lower housing section 53 has an interior portion 62 forming a sample chamber terminated by upper and lower bores of smaller diameter. The mandrel 48 extends through the sample chamber 62 and has upper and lower plug portions for sealing in the housing bore to trap a fluid sample therebetween. Above the upper plug portion, the mandrel has a central bore 63 having a lateral test port 64. Bore 63 is open to the upper end of the mandrel 48 and thus to the interior of the pipe 40 and sample chamber 24 formed by the pipe thereabove. Hence, the sample chamber 62 in the tester and the mandrel test port 64 are simultaneously closed to fluid flow when the mandrel 48 and housing 49 are in the expanded position shown in FIG. 1. When the mandrel is moved downwardly relative to the housing, the test port 64 is opened to the sample chamber 62 while the lower plug is displaced from the lower bore permitting flow of fluid via the lower bore, sampling chamber, test port and mandrel bore to the interior of the string of pipe.

The bypass mandrel 51 is threadedly connected to the lower end of the tester housing and is slidably and non-rotatably coupled within housing 65 by any suitable means (not shown). The bypass housing has a bypass port 66 which can be opened or closed by manipulation of the bypass mandrel 51 relative to the bypass housing 65 and is used to shunt fluid to the exterior of the tool as shown by the arrows in FIG. 2. A system of differential pressures acting on the testing and bypass members retards the opening of the bypass valve while it is closed yet permits unretarded or rapid movement of the valve to a closed condition. This same effect may be accomplished by other bypass systems as for example one incorporating a delay feature which permits rapid closing and slow opening of the bypass.

The bypass housing is, in turn, coupled to a mandrel 67 of the safety joint 18, the safety joint mandrel being telescopically received in a housing of the safety joint. The safety joint may be, for example, the type shown in U.S. Patent No. 2,708,100. The safety joint housing is, in turn, connected to an upper housing 68 of the packer assembly 14, the packer housing being slidably mounted relative to the tubular packer mandrel 69 carrying a packer element 70. Below the packer element 70 a perforated anchor 12 is attached to the packer mandrel 69. The anchor 12 carries conventional pressure recorders 42 and permits fluid flow into the bore 72 in the packer mandrel. Two pressure recorders 42 are provided, one recorder measuring pressures external of the anchor and the other measuring pressures internally of the anchor.

Figure 3B:
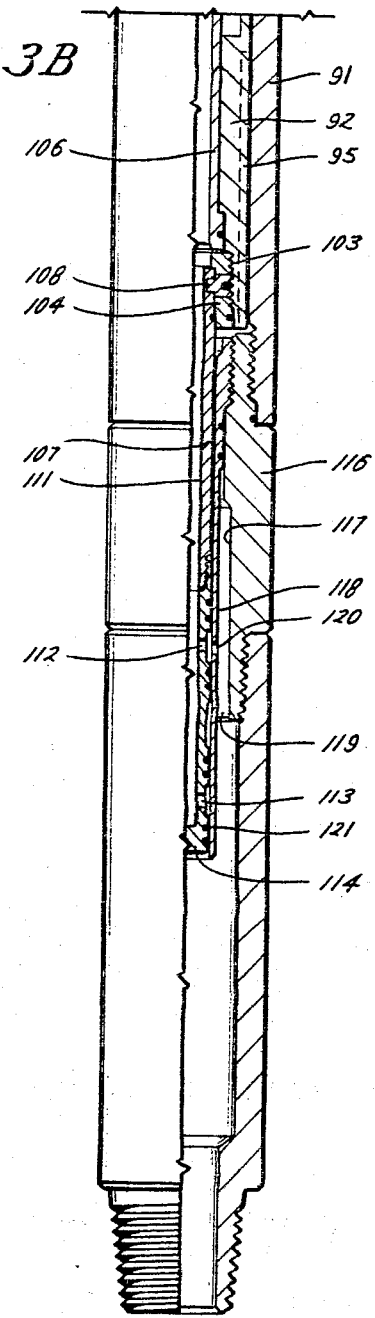

FIGS. 3A and 3B show details of the valve 34 positioned at the upper end of the sample section or closed chamber 24 (FIG. 1). The supporting string of pipe 36 is shown connected to the upper end of a tubular mandrel section 76 in the valve 34. The tubular mandrel has a central bore 77 longitudinally extending therethrough. Mounted about the mandrel is a ball thrust bearing 78, the upper race 79 of which is positioned against an outwardly projecting shoulder on the mandrel 81. The thrust bearing has a lower race 82 which rests against the upper face of a split collar 83. The parts of the collar are held together by clamping bolts 84. The collar 83 rests against the end face 86 of the upper section 87 of a tubular housing. The housing is formed at its lower end with a threaded pin 88 to extend within a threaded box 89 of an intermediate housing section 91 carrying a sliding nut 92. The nut 92 is cylindrical and fits within a central bore 93 in the intermediate housing section 91. The nut 92 is formed with an internally threaded bore 94 which has acme or other type coarse threads to receive threads 96 formed upon a length of the main tubular mandrel section 76. The main tubular mandrel section is formed with a collar 97 which in its upper position abuts against a lower stepped face 98 on the pin end of the upper tubular housing section 87. The upper end of the housing section 87 is formed with a counterbore 99 to receive packing 101 which circumscribes the mandrel and is held in position by a stuffing gland 102 threaded into the upper end of the counter bore. The mandrel 76 extends through the packing with a substantially tight fit.

The lower end of the nut 92 has an interior threaded portion 103 for receiving a threaded collar 104. An upwardly extending tubular sleeve or wash pipe 106 is supported by the collar 104 and prevents test fluids from entering the cooperating threads of the nut and mandrel. The outer surface of the nut is splined to the intermediate housing as at 105. A lower mandrel section 107 depends from the collar 104 and is attached thereto by means of a shear pin 108. The lower mandrel 107 has a central longitudinally extending passageway or bore 111 through which fluid may flow. The walls of the lower mandrel are formed with longitudinally spaced radial ports 112, 113 for a purpose to be hereinafter described. The lower end 114 of the mandrel section is closed.

Attached to the intermediate housing section 91 is a lower housing section 116 having an inner bore 117. A valve sleeve 118 is threaded within the inner bore 117 of the lower housing section and is spaced from the inner wall of the lower housing section to provide a flow passageway 119. A port 120 in the sleeve 118 permits fluid communication from the lower end of the valve housing through the passageway 119 into the central bore 111 of the lower mandrel section 107. The lower mandrel section is provided with seals 121, above and below ports 112 and 113, which slidably and sealingly engage the inner bore of the valve sleeve 118. As the lower mandrel 107 and valve ports therein move longitudinally relative to the valve sleeve 118, the ports 112, 113 in the mandrel become sequentially aligned with the port 120 in the housing section to provide fluid communication between the bore in the lower housing and the bore in the mandrel. It is also readily seen that as the seals 121 on the lower mandrel are moved to straddle the port 120 in the valve sleeve, such fluid communication between the housing and mandrel bores is prevented.

The bar dropper sub 32 (FIG. 1) is positioned directly below the upper valve in the tool string. The sub includes threaded box and pin ends for connection in a string of pipe. The sub has a flow passage 126 extending longitudinally therethrough. An inwardly extending shoulder 127 is formed in the bore at the upper end thereof to form a restriction in the bore. An intermediate shoulder portion 128 forms a lesser restriction in the bore below shoulder 127.

A cylindrical knock-out plug 131 is positioned within the intermediate portion of the bore with the upper surface of the plug abutting shoulder 127. The plug is sized for close fitting but sliding reception within the intermediate bore portion. An annular recess 132 is formed in the outer peripheral surface of the plug midway between its top and bottom. The lower end of the plug has a threaded recessed portion for receiving the upper threaded end of a weighted drop bar or dart 133. A transverse bore is formed through the wall of the sub housing. A drop bar retainer pin 136 is positioned in the transverse bore with one end of the pin extending into the recess 132 in the plug. The other end of the pin is provided with a recess to accommodate a wrench or tool to rotate the threaded pin for withdrawing the pin from the recess in the plug. A plurality of passageways 137 are formed longitudinally through the sub to provide fluid communication through the sub. Therefore, even when the dart and plug are positioned in the sub, fluids are permitted to flow through the passageways 137, bypassing the dart and plug.

In the operation of the apparatus described herein, the tool string shown in FIG. 1 is run into the well bore with the bypass valve open and the formation tester valve closed. The valve at the upper end of the sample chamber is open. Upon reaching the position in the well bore where the formation test is to be conducted, the packer is expanded into engagement with the well bore to isolate the formation. The bypass valve is closed and the tester valve is opened. The formation tester of FIG. 2 is opened by up-and-down manipulation of the tester mandrel to move the index pin in the index slot on the mandrel thereby rotating the upper swiveled section 52 of the housing to permit passage of the lugs 56 through splines 57 for movement of the mandrel to a position exposing the port 64 and permitting fluids to flow upwardly through the chamber 62 into the bore of the mandrel in the tester and tool string thereabove.

As fluids begin to flow into the sample chamber 24 formed by drill pipe above the tester, air in the sample chamber 24 is displaced upwardly through the bar dropper sub 32 and the opened valve 34 at the upper end of the sample chamber. The movement of the displaced air is transmitted to the surface and can be observed at the surface to indicate that the formation tester valve has opened and that fluids are flowing into the sample chamber 24.

Upon receiving this indication of tester valve operation at the surface, the valve 34 at the upper end of the chamber 24 is closed by rotation of the drill string. Rotation of the drill string is transmitted through the nut 92 to the lower mandrel 107 to move the mandrel upwardly and seal off port 120 in the valve sleeve 118. This closure of the valve 34 at the upper end of the chamber 24 prevents any formation fluids flowing into the sample chamber from entering the drill pipe above the valve 34. After a suitable period has elapsed, the formation tester valve 22 is closed to shut in the formation. The formation tester valve 22 may then be opened and closed as many times as desirable. At the end of the test the valve 22 is closed, the packer is contracted, and the tool string is raised from the well bore.

Upon the upper valve 34 reaching the surface or drilling platform, a flow line (not shown) is attached to the threaded upper end of the valve. The valve mandrel 76 is rotated counterclockwise, communicating ports 112 and 129, to thereby open the upper end of the sample chamber 24. This permits pressure within the sample chamber to bleed off through the flow line which, in turn, is connected to a tank or other such closed receptacle for maintaining the contents of the sample chamber in a closed system. After opening of the upper valve 34, the bar dropper sub 32 is activated by unscrewing the pin 136 and releasing the bar or dart 133 within the sample chamber 24. The bar or dart 133 falls to the lower end of the sample chamber and breaks the plugs or valve closures 30 in the reversing sub 26. Subsequently, pressure is applied, by means of mud pumps or the like, to the annular space in the well bore thereby forcing drilling mud or fluid into the ports 28 in the reverse circulating sub 26 to reverse out any formation fluid recovery in the sample chamber 24 through the flow line and into the closed receptacle. When all the formation fluid has been reversed into the closed receptacle, the rest of the tool string is broken out.

Sometimes during the testing of a well, a portion of the tool string becomes stuck in the well bore. For example, the packer may fail to unseat. In order to free the stuck tool string, it is sometimes desirable to lower a string shot through the tool string to a position in the tool string where the string shot may be activated to loosen threads in the string of tools. The loosening of such threads permits the uncoupling of the tool string at that point so that tools above that point may be withdrawn from the well bore.

It is necessary to have a continuous bore through the tool string in order to lower such equipment as a string shot therein. To provide the continuous bore, a weighted member may be dropped from the surface of the tool string. Such weighted member will strike the bottom end of the lower mandrel 107 causing the shear pin 108 to fail so that the lower mandrel will drop through the string of tools to the bottom of sample chamber 24. If a bar dropper sub is positioned below valve 34 as in FIG. 1, the falling weighted bar and lower mandrel engage the plug in the bar dropper sub and shear the release pin 136 therein to open the bore in the bar dropper sub. Thereafter the weighted member, lower mandrel 107 and bar dropper plug 131 and dart 133 fall through the chamber to the lower end of the chamber 24. The formation tester 22 may also be rendered full opening in a similar manner as shown in a copending application Ser. No. 333,225, now Patent No. 3,308,887. With the opening of a bore through the string of tools, a string shot or other similar device may be lowered therein to a position for loosening threads in the string of tools.

While a particular embodiment of the present invention has been shown and described, it is apparent that the changes and modifications may be made without departing from this invention in its broader aspects and, therefore, the aim in the appended claims is to cover all such changes and modifications as fall within the true spirit and scope of this invention.

I claim:

1. A method of drill stem testing comprising the steps of: lowering a packer, a chamber having an open upper end and a valved tester between the packer and the chamber into a well bore on a pipe string; setting the packer to isolate a formation interval to be tested; opening the tester to permit formation fluids to enter the well bore and flow upwardly through the tester and chamber toward the pipe string; closing the upper end of the chamber before formation fluids enter the pipe string and then permitting a fluid sample to collect in the chamber; closing the tester to trap the sample in the chamber; unsetting the packer; and then raising the closed chamber, the tester and the packer to the earth's surface with the sample enclosed in the chamber where the sample can be removed safely and in secrecy.

2. The method of claim 1 further including the step of detecting at the earth's surface whether or not the tester is opened before performing the recited step of closing the upper end of the chamber.

3. The method of claim 1 further including the steps of, when the chamber appears at the surface, opening the chamber to bleed off the fluid pressure of the sample; and then reversing the fluid sample out of the chamber.

4. Apparatus for use in performing a closed chamber drill stem test of an earth formation traversed by a well bore comprising: valve tester means which can be opened and closed to the flow of formation fluids; a chamber sub coupled at its lower end to said tester means; selectively operable normally open valve means adapted for connection between said chamber sub and a pipe string extending to the earth's surface; means responsive to movement of the pipe string for closing said valve means; normally closed reversing ports in the wall of said chamber sub adjacent the lower end thereof; and means within said chamber sub for opening said reversing ports.

5. The apparatus of claim 4 further including means to enable opening of said valve means to the vertical passage of instruments therethrough.

6. The apparatus of claim 4 wherein said means within said chamber sub includes a drop bar releasably held in said chamber sub below said valve means and above said reversing ports.

7. The apparatus of claim 6 further including means operable from the exterior of said chamber sub for releasing said drop bar.

8. The apparatus of claim 4 wherein said valve means includes inner and outer tubular members having passageways for placing the pipe string and the chamber sub in fluid communication, said members being responsive to rotation of one of said members relative to the other to move said passageways into and out of fluid communcation.

9. The apparatus of claim 4 wherein one of said tester means and valve means is operable in response to longitudinal movement only of the pipe string and the other is operable in response to rotational movement of the pipe string.

10. Apparatus for use in a well bore comprising: inner and outer telescoping tubular members having passageways and port means for placing said passageways in fluid communication in at least one relative position of said members; a mandrel adapted for connection to a pipe string; means between said mandrel and one of said members responsive to rotation of said mandrel relative to both of said members for moving said members longitudinally relative to one another; means for releasably connecting said inner member to said moving means; and means for disabling said connecting means to enable movement of said inner member from telescoping relation to said outer member, whereby said outer member provides a substantial vertical opening for the passage of instruments therethrough.

References Cited
UNITED STATES PATENTS

| | | | |
|---|---|---|---|
| 2,913,053 | 11/1959 | Westbrook | 166—3 X |
| 3,096,823 | 7/1963 | Crowe | 166—3 X |
| 3,115,776 | 12/1963 | Green | 73—155 |
| 3,356,137 | 12/1967 | Raugust | 166—162 X |

OTHER REFERENCES

Bleakley, W. B.: Modern Drill-Stem Testing, from Oil and Gas Journal, vol. 56, No. 51, Dec. 22, 1958, pp. 58–63.

RICHARD C. QUEISSER, *Primary Examiner.*

JERRY W. MYRACLE, *Assistant Examiner.*